United States Patent Office 3,347,359
Patented Oct. 17, 1967

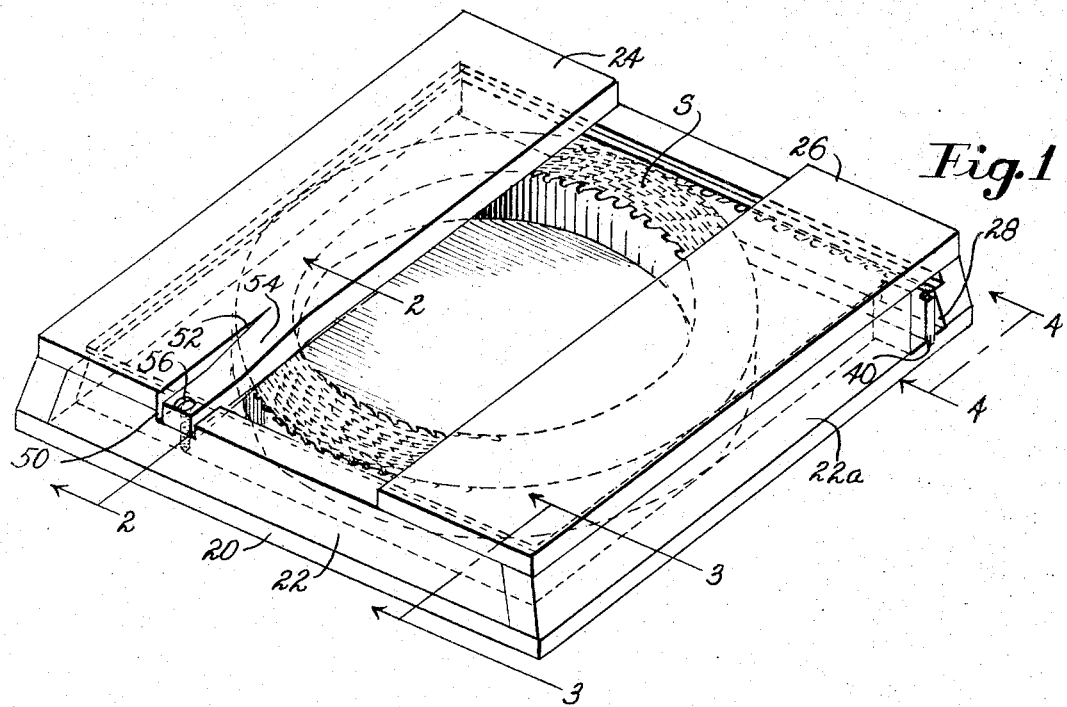
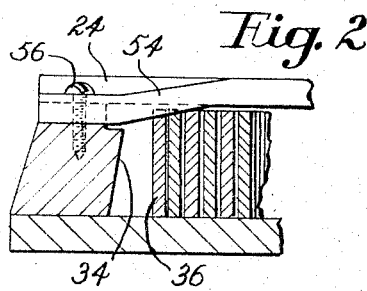
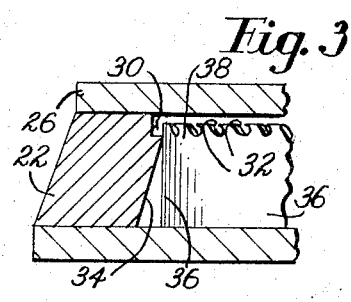
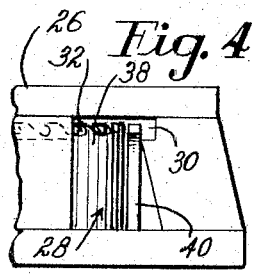
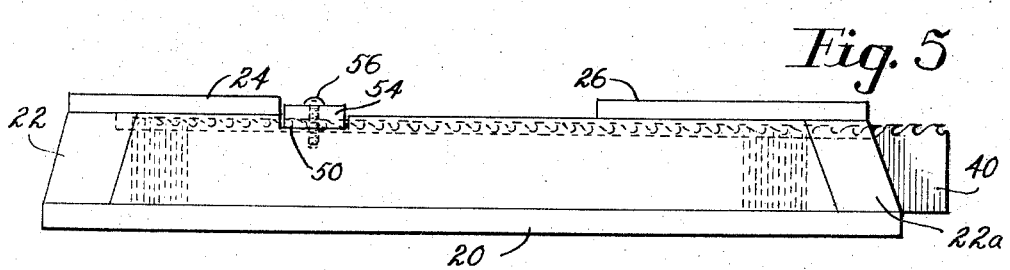
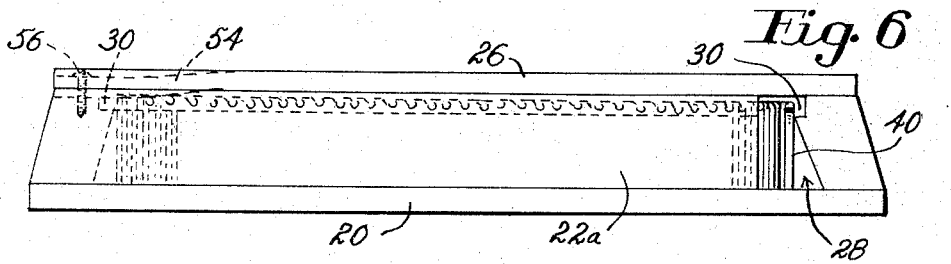

3,347,359
BAND SAW BOX
Victor A. Kolesh, Holden, and Walter E. Lamlein, Leominster, Mass., assignors to Wallace-Murray Corporation, a corporation of Delaware
Filed Mar. 17, 1966, Ser. No. 535,109
4 Claims. (Cl. 206—52)

ABSTRACT OF THE DISCLOSURE

A package for a coiled band saw length has side walls so contoured that the band saw when seated on the bottom of the box has only a line contact with the side walls just below the gullets of the band saw length. The position of the saw in the box is positively retained by a releasable means which is movable down onto the top of the saw teeth in locking engagement therewith and clamps the coil not only against the bottom of the box but against rotation to prevent inadvertent uncoiling of the coil or exertion of undesirably high pressure against the side walls, the releasable means being preferably in the form of a wooden slat which is split so that a portion of it can be bent downwardly into a cooperating notch made in one of the side walls and retained therein by a removable screw.

---

This invention relates to the packaging of band saw lengths and more particularly to their packaging in compact coiled form in a manner permitting easy extraction of the whole or only a part of the packaged band saw length.

When band saw lengths are shipped in coiled form, as is usual in the trade, they are coiled for compactness so tightly as to tension the convolutions, rendering the coiled length, in effect, a coiled spring. The expansive force of the coil, particularly as a result of shaking during transport often causes the spring to expand against the restraining surfaces of the box with sufficient force to lock the coil very firmly in place, making it difficult to remove the coil from the box unless the coil is first tightened which is at best an arduous task. Whether tightened or not, the removal of the coil upwardly out of the box axially of its coiled configuration is dangerous because of the spring-like action when the coil is released from the restraining surfaces.

A primary object of the invention is hence to provide a simple package which properly restrains a coil of band saw length so compactly as to be under considerable tension, but from which the length can be readily extricated either in whole or in part by a simple uncoiling operation obviating any danger of the coil springing open.

To this end, the package of the invention contains a coiled band saw length whose free outer end is accessible through an appropriate aperture in the side of the box so that by pulling the end through the aperture the coil rotates within the confines of the container and unwinds with a minimum of frictional resistance by reason of neither its teeth nor any great area of its outer convolution engaging inside surfaces of the box.

In addition, the package preferably incorporates readily releasable simple means for preventing inadvertent rotation of the coil during transport or after partial removal only of the contents, so that the free end will be maintained accessibly adjacent to the removal aperture until it is desired to unwind or further unwind the contained coil.

Such a package accomplishing the above and other objects of the invention is shown in the accompanying drawings wherein:

FIG. 1 is an isometric view of a packaged band saw length;

FIG. 2 is an enlarged cross-sectional view taken along the line 2—2 of FIG. 1;

FIG. 3 is an enlarged cross-sectional view taken along the line 3—3 of FIG. 1;

FIG. 4 is an enlarged elevational fragmentary view indicated at 4—4 in FIG. 1;

FIG. 5 is an elevational view of one side of the package; and

FIG. 6 is an elevational view of another side of the package.

In the drawing, the package is shown as being a rectilinear box made most conveniently from wood and having a bottom wall 20, side rails 22, and two slat covers 24 and 26. One side rail 22a is shortened to leave an aperture 28 at corner A.

Each of the side rails has its inside surface at least along its central area contoured as shown in FIG. 3 to include a recess 30 at a height just below the teeth gullets 32 of the contained spirally coiled band saw S and being tapered downwardly at 34 below the recess. Thus the outer convolution 36 of the contained coil has an almost single line contact with the four side walls, near their central areas. In addition, the overall depth of side rails 22 is greater than the depth of the band saw so that while the coil S rests on the bottom wall 20, its upstanding teeth 38 are below and therefore do not contact the under surface of the top slats 24 and 26.

Therefore, the band saw length may be extricated from the package without disturbing any of the walls of the package merely by pulling the end 40 of the coil outwardly through the aperture 28 (as indicated in FIG. 5); and despite the spring tension of the coil, the bearing surface of the outer convolution 36 against the side walls of the box is reduced to a minimum so that the frictional drag under the tension is made as small as possible, there being no drag by reason of any engagement of the teeth 38 with either the side walls 22 or the under side of the top covers 24 and 26.

Simple releasable means for maintaining the coil against inadvertent rotation is provided by a notch 50 in one of the side walls 22 beneath the inside edge of cover slat 24 and then slitting the cover 24 partially inwardly as at 52 to provide a depressible portion 54 of the cover which can be depressed downwardly out of the plane of the under surface of the remainder of the top slat 24 into locking engagement with upstanding underlying teeth 38 in at least the outer convolution in the coil and into notch 50 where it can be retained by a single screw 56. Screw 56 can readily be released when the coil is to be unwound and may be readily tightened again after removal of only a portion of the coil.

While the package is rectilinear as shown in the drawing, it is contemplated that it may be made of other polygonal or even circular shape though the latter tends to provide more outer convolution area contact with the box than is desirable.

What is claimed is:

1. A band saw package comprising a hollow box having a bottom wall, side walls and top covering means, one of said side walls defining an aperture adjacent one corner of said box for exposing the outer end of a flexible band saw length, having upstanding teeth and intervening gullets along one edge and a height less than the inside depth of said box, helically coiled within the confines of said box under tension between said side walls, said aperture providing egress for said saw linearly from said box by uncoiling rotation of said coil with its untoothed bottom edge bearing on the bottom of said box and its toothed edge rotating below the under surface of the top covering means, the inside surfaces of said side walls being relieved outwardly above and below a uniform height line located just below the gullets of said band saw length so that the outer side of any outer convolution of a coil of band saw length placed in said box bears against said side walls only along a line below its teeth to permit uncoiling of said coil with said teeth being unengaged by said side walls and with said outer convolution frictionally engaging said side walls only along said line.

2. A band saw package comprising a hollow box having a bottom wall, side walls and top covering means, one of said side walls defining an aperture adjacent one corner of said box for exposing the outer end of a flexible band saw length, having upstanding teeth along one edge, spirally coiled within the confines of said hollow box under tension between said side walls, said aperture permitting egress of said band saw linearly from said container by uncoiling rotation of said coil relative to said box with its untoothed bottom edge bearing on the inside surface of the bottom wall of said box and its toothed edge rotating below the inside of the top covering means, and releasable means movable from a position overlying the top of said spirally coiled band saw length downwardly on top of and into locking engagement with at least some of the upstanding teeth of said band saw length to prevent inadvertent rotation of said coil in said box and maintain the end of said coil accessibly adjacent said aperture until said teeth engaging means is released.

3. A band saw package as claimed in claim 2 wherein the releasable means includes a notch formed in the top of one of said side walls and wherein a portion of said top covering means superposed over said notch is slit inwardly from said side wall and bent downwardly out of the plane of the under side of said covering means into said notch to engage at least some of the upstanding teeth on the outer convolution of said coil.

4. A band saw package as claimed in claim 3 wherein said box is made of wood and said bent cover portion is held in said notch by a screw.

References Cited

UNITED STATES PATENTS

| | | | |
|---|---|---|---|
| 2,796,170 | 6/1957 | Davis | 206—52 |
| 3,087,608 | 4/1963 | Craven | 206—52 |
| 3,260,360 | 7/1966 | Davis | 206—52 |

WILLIAM T. DIXSON, JR., *Primary Examiner.*

UNITED STATES PATENT OFFICE
CERTIFICATE OF CORRECTION

Patent No. 3,347,359                      October 17, 1967

Victor A. Kolesh et al.

It is hereby certified that error appears in the above numbered patent requiring correction and that the said Letters Patent should read as corrected below.

Column 3, line 4, for "teeth" read -- gullets and above its bottom edge --.

Signed and sealed this 3rd day of December 1968.

(SEAL)
Attest:

Edward M. Fletcher, Jr.                      EDWARD J. BRENNER

Attesting Officer                          Commissioner of Patents